United States Patent
Reents et al.

(10) Patent No.: US 10,389,658 B2
(45) Date of Patent: Aug. 20, 2019

(54) AUTO ZERO COPY APPLIED TO A COMPUTE ELEMENT WITHIN A SYSTOLIC ARRAY

(71) Applicant: EXTEN Technologies, Inc., Austin, TX (US)

(72) Inventors: Daniel B. Reents, Dripping Springs, TX (US); Ashwin Kamath, Cedar Park, TX (US); Todd Blackmon, Pflugerville, TX (US); Michael Enz, Fargo, ND (US)

(73) Assignee: Exten Technologies, Inc., Austin, TX (US)

( * ) Notice: Subject to any disclaimer, the term of this patent is extended or adjusted under 35 U.S.C. 154(b) by 0 days.

(21) Appl. No.: 15/844,505

(22) Filed: Dec. 15, 2017

(65) Prior Publication Data
US 2019/0190855 A1    Jun. 20, 2019

(51) Int. Cl.
*H04L 12/861* (2013.01)
*H04L 12/863* (2013.01)
*H04L 12/935* (2013.01)
*G06F 15/163* (2006.01)

(52) U.S. Cl.
CPC ............ *H04L 49/90* (2013.01); *G06F 15/163* (2013.01); *H04L 47/50* (2013.01); *H04L 49/3063* (2013.01)

(58) Field of Classification Search
None
See application file for complete search history.

(56) References Cited

U.S. PATENT DOCUMENTS

| | | | | |
|---|---|---|---|---|
| 5,761,427 A | * | 6/1998 | Shah | G06F 13/128 709/223 |
| 7,243,354 B1 | * | 7/2007 | Chhabra | G06F 9/546 718/100 |
| 8,055,818 B2 | * | 11/2011 | Craddock | G06F 5/065 710/52 |
| 8,275,903 B1 | * | 9/2012 | Shao | G06F 9/5016 709/232 |
| 8,302,109 B2 | * | 10/2012 | Arimilli | G06F 9/546 719/321 |
| 2010/0169528 A1 | * | 7/2010 | Kumar | G06F 13/385 710/263 |
| 2010/0217905 A1 | * | 8/2010 | Arimilli | G06F 9/545 710/263 |
| 2013/0266021 A1 | * | 10/2013 | Basso | G06F 5/10 370/413 |

* cited by examiner

*Primary Examiner* — Hong S Cho
(74) *Attorney, Agent, or Firm* — Sprinkle IP Law Group

(57) ABSTRACT

The present subject disclosure presents a hardware mechanism and usage model for using a compute element of a systolic array to handle messages from an RQ (Receive Queue) to SQ (Send Queue) without requiring a copy between queues and also minimizing the local processor's interaction with the send and receive queue hardware.

12 Claims, 1 Drawing Sheet

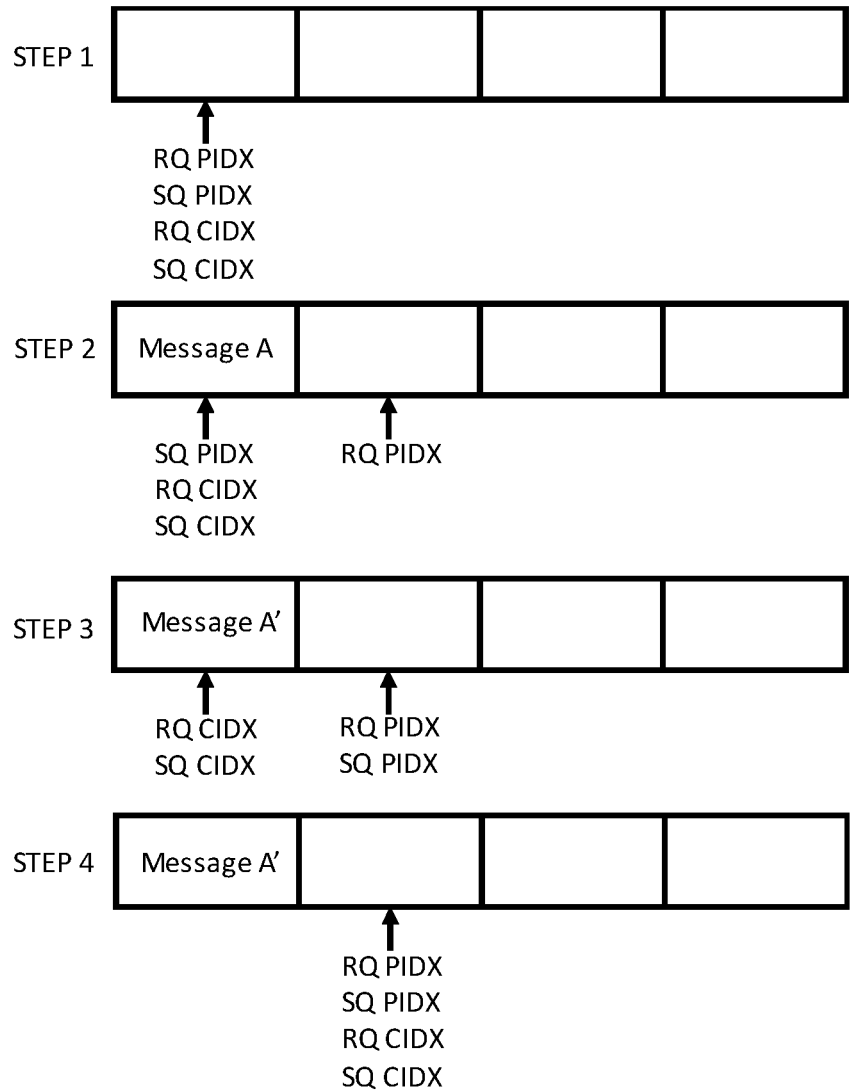

AUTO ZERO COPY APPLIED TO A COMPUTE ELEMENT WITHIN A SYSTOLIC ARRAY

TECHNICAL FIELD

The subject disclosure relates generally to computer hardware and software design. In particular, the subject disclosure relates a zero copy pipeline applied to a compute element within a systolic array.

BACKGROUND

A basic pipeline usage module applies when a compute element is required to receive a message, modify some portion of it, and then send the message out to some other target (e.g., node) within the systolic array. The overhead of message passing burdens the processor as it interacts with hardware direct memory access (DMA) engines or message passing interfaces, reducing cycles available for other work. Delays in message passing may significantly reduce performance for highly optimized pipelines.

SUMMARY OF THE SUBJECT DISCLOSURE

The present subject disclosure presents a hardware mechanism and usage model for using a compute element of a systolic array to handle messages from an RQ (Receive Queue) to SQ (Send Queue) without requiring a copy between queues and also minimizing the local processor's interaction with the send and receive queue hardware.

In one exemplary embodiment, the present subject matter is a method for performing a zero copy to a compute element in a systolic array. The method includes placing an RQ and SQ in the same location in a queue memory, wherein the RQ and PQ have the same base address, entry size, and number of entries; receiving a message in the RQ in a given queue location; processing the message; and transmitting the message out using the SQ; wherein the given queue location is not used until the SQ transmits the message.

In another exemplary embodiment, the present subject matter is a method for performing a zero copy to a compute element in a systolic array. The method includes placing an RQ and SQ in the same location in a queue memory; receiving a message in the RQ in a given queue location; processing the message; and transmitting the message; wherein the given queue location is not used until the message is transmitted.

In yet another exemplary embodiment, the present subject matter is a system for or performing a zero copy to a compute element in a systolic array. The system includes a queue memory module, wherein a message is entered in a given queue location by a RQ, and wherein a corresponding SQ is associated with that given queue location.

BRIEF DESCRIPTION OF THE DRAWINGS

Various exemplary embodiments of this disclosure will be described in detail, wherein like reference numerals refer to identical or similar components or steps, with reference to the following FIGURES, wherein:

FIG. 1 illustrates a four part process of handling queues in a compute element, according to an exemplary embodiment of the present subject disclosure.

DETAILED DESCRIPTION

The present subject disclosure presents techniques with optimize standard message passing using producer/consumer queues so as to minimize the local processor's interaction with the hardware. The hardware is aware of a send and receive queue pair being configured in the zero copy mode and changes its behavior to offload common data transfer operations from the processor to a dedicated hardware component.

The standard hardware design allows the type of operations that are described above but the present subject matter minimizes the processor's interaction with the hardware. The simplest example of utilizing the hardware in its standard operating mode to receive messages, modify all or a portion of that message, and then send the message out would be for the hardware to have a physically separate RQ and SQ located in the node's queue memory. In this example, the incoming message would populate an entry (or entries) in the RQ and the hardware would advertise this to the firmware. The firmware would respond by: checking that the targeted SQ has an entry available; reading the message out from the RQ into its local data memory; modifying the appropriate fields of the message within the local data memory; write the message to the given SQ; incrementing the SQ's producer index to send the message out. This is conventional way of handling messages. The present subject disclosure seeks to streamline the process and eliminate some of these steps.

There are many novel aspects of the mechanism discussed according to the present subject disclosure. For example, the present subject disclosure allows the local processor to configure the hardware to associate an RQ to an SQ and have them operate in zero copy mode. This allows the RQ and the SQ to share the same physical memory and eliminate the need for the firmware to copy messages and track the producer and consumer indexes for both the RQ and the SQ. This provides an operational performance improvement over standard methods. Many other advantages are also evident and appreciated by one having ordinary skill in the art.

The present subject disclosure defines an application where a node receives a message, modifies the message and then passes the modified version on to the next node. To use the no-copy features, the input and output messages should preferably have the same size and be one-to-one (i.e., one message is sent out per each received message).

In further describing the present subject matter, it is helpful to use a number of acronyms. They include: SQ=Send Queue; RQ=Receive Queue; CIDX=Consumer Index; PIDX=Producer Index. Send and Receive queues are standard consumer/producer circular queues where the valid entries are defined by the consumer and producer indices on the queue.

A zero copy configuration according to the present subject disclosure allows an SQ/RQ pair to overlay the same Queue Memory location, thereby removing the need for the firmware to copy the message during processing.

FIG. 1 depicts an exemplary four part operation of the zero copy process according to the present subject disclosure. The four parts are labeled as (Step 1) to (Step 4) from top to bottom. Starting with empty queues (Step 1), the SQ and RQ PIDX values and CIDX values are the same. Then, as Message A arrives, the RQ PIDX will increment (Step 2). This will enable scheduling of the processor to read and modify the entry in the queue, transforming Message A into Message A'. When the firmware processing is complete, it will increment the SQ PIDX to send Message A' to the next node in the pipeline (Step 3). Finally, the hardware increments both the RQ and SQ CIDX when the SQ completes sending the message out (step 4).

The following steps are offloaded to the hardware to save processor cycles. (a) The RQ's CIDX is no longer updated by firmware. It is automatically updated by the hardware when the associated SQ's CIDX is updated after the message is transmitted. The RQ and SQ CIDX values should always be equal in this mode. (b) The processor no longer needs to check for available space in the SQ for sending a message. (c) The processor does not read or copy any portion of the message that remains constant. Large portions of the message may simply pass through the pipeline with zero processor cycles.

The subject matter described herein may be used in a variety of preferred ways, including, for example: (a) generation of a module level description of the mechanism; (b) low level, micro-architecture document showing block level flow diagrams for the implementation; (c) generation of Verilog RTL to implement the design; (d) block level simulation to verify the design and modify any issues found; (e) bring up and testing utilizing a hardware emulation platform; (f) integration into the top level design; (g) system level simulation; (h) standard back-end ASIC development process to produce the targeted device. Other variations are also possible.

Alternate uses of the subject disclosure are also within the scope of the present disclosure. For example, the present subject disclosure describes a fairly generic type of operation that would be commonly used by a compute node within a systolic array. The next level of detail (i.e., the node or application specific operation) would define how the processor is required to modify the incoming message prior to it being sent back out into the array to target the next targeted node. It is conceivable that additional hardware could be implemented to automate the message modifications based on standard lookup mechanisms, etc. and to also automate sending of the message after modifications.

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A method for performing a zero copy to a compute element in a systolic array, comprising:
   placing an RQ and SQ in the same location in a queue memory, wherein the RQ and PQ have the same base address, entry size, and number of entries;
   receiving a message in the RQ in a given queue location;
   processing the message; and
   sending the message out using the SQ;
   wherein the given queue location is not used until the SQ sends the message and any message existing in the RQ will not be overwritten by a new message until the SQ sends the message.

2. The method of claim 1, wherein the SQ should always be available when an RQ message arrives.

3. The method of claim 1, wherein a full RQ cannot receive another message until the SQ sends the next message.

4. The method of claim 1, wherein the RQ is automatically freed upon the SQ sending the message.

5. The method of claim 1, wherein when the message is sent out, both the RQ and SQ consumer index is incremented.

6. The method of claim 5, wherein when the RQ and SQ consumer index is incremented, the RQ can reuse the given queue location.

7. A method for performing a zero copy to a compute element in a systolic array, comprising:
   placing an RQ and SQ in the same location in a queue memory; and
   receiving a message in the RQ in a given queue location;
   processing the message; and
   sending the message;
   wherein the given queue location is not used until the message is sent and any message existing in the RQ will not be overwritten by a new message until the SQ sends the message.

8. The method of claim 7, wherein the SQ should always be available when an RQ message arrives.

9. The method of claim 7, wherein a full RQ cannot receive another message until the SQ sends the next message.

10. The method of claim 7, wherein the RQ is automatically freed upon the SQ sending the message.

11. The method of claim 7, wherein when the message is transmitted out, both the RQ and SQ consumer index is incremented.

12. The method of claim 11, wherein when the RQ and SQ consumer index is incremented, the RQ can reuse the given queue location.

* * * * *